US010618195B2

(12) United States Patent
  Seed

(10) Patent No.: US 10,618,195 B2
(45) Date of Patent: Apr. 14, 2020

(54) WOOD SPLITTING AID

(71) Applicant: Nicholas Hysni Seed, Meaford (CA)

(72) Inventor: Nicholas Hysni Seed, Meaford (CA)

( * ) Notice: Subject to any disclaimer, the term of this patent is extended or adjusted under 35 U.S.C. 154(b) by 208 days.

(21) Appl. No.: 15/361,662

(22) Filed: Nov. 28, 2016

(65) Prior Publication Data
US 2017/0151689 A1 Jun. 1, 2017

(30) Foreign Application Priority Data

Nov. 26, 2015 (GB) .................................. 1520875.4

(51) Int. Cl.
| | | |
|---|---|---|
| *B27L 7/08* | (2006.01) | |
| *B65D 21/02* | (2006.01) | |
| *B65D 81/36* | (2006.01) | |
| *B65D 85/00* | (2006.01) | |

(52) U.S. Cl.
CPC ............ *B27L 7/08* (2013.01); *B65D 21/0233* (2013.01); *B65D 81/36* (2013.01); *B65D 85/70* (2013.01)

(58) Field of Classification Search
CPC ......... B27L 7/08; B27L 7/00; B65D 21/0209; B65D 21/0228; B65D 21/0233; B65D 21/0234; B65D 81/00; B65D 81/36; B65D 81/361; B65D 85/70; B65F 1/14; B65F 1/16
USPC ......................................... 29/281.1; 248/101
See application file for complete search history.

(56) References Cited

U.S. PATENT DOCUMENTS

| | | | | |
|---|---|---|---|---|
| 8,899,435 | B1 * | 12/2014 | Reder ................ | A47G 19/2205 206/507 |
| 2008/0073361 | A1 * | 3/2008 | Brouard .................... | B27L 7/08 220/669 |
| 2008/0190930 | A1 * | 8/2008 | Vogel ................. | B65D 21/0222 220/276 |
| 2016/0107330 | A1 * | 4/2016 | Hutchinson ............... | B27L 7/06 225/81 |

* cited by examiner

*Primary Examiner* — Edelmira Bosques
*Assistant Examiner* — Aaron R McConnell
(74) *Attorney, Agent, or Firm* — Sand, Sebolt & Wernow Co., LPA

(57) ABSTRACT

The wood splitting aid of the invention includes a resilient bucket that attaches at its bottom to a base block bucket of similar shape and size to be used in conjunction with a hand-splitter such as an ax or splitting-mall. The resilient or flexible upper bucket holds a plurality of split pieces of corded firewood in an upright position for hand chopping and absorbs both horizontal and vertical forces of wood splitting. The split wood pieces are maintained in a general upright position adjacent their neighboring pieces. The base block bucket provides both a safe and ergonomic chopping height which absorbs and distributes the predominantly remaining vertical force of wood-splitting action against solid ground. The buckets are detachably connected bottom to bottom and are nesting when disconnected for easy portability, use, storage and reuse in an urban environment.

20 Claims, 6 Drawing Sheets

WOOD SPLITTING AID

This application claims priority from an application of the same title filed in Britain under serial number 1520875A on 26 Nov. 2015.

FIELD OF THE INVENTION

The field of the invention relates to hand chopping of previously split pieces of firewood into smaller pieces of kindling.

BACKGROUND

Man has been chopping wood for millennia, most often in a standard manner wherein a piece of transverse cut wood is stood atop a large base block thereby exposing its weaker end grain to aggressive chopping action by a sharpened heavy blade, such as by an ax, a maul or a wedge. In this action the energy of the moving blade is transferred into the block lengthwise of the grain so as to create a crack and cross-wise to increase the separation in that crack. Of course, wood is not a uniform material. It has long been the practice to utilize a large chopping block of sturdy wood as the base block in order to optimize utility and safety, the larger and more sturdy the better. Of course, such larger blocks are heavy and cumbersome to deploy and use, often resulting in a chopping area requiring a rather large area of exclusive use. Problems and safety issues arise as the pieces being chopped out become smaller and smaller as they become more difficult to stand on end and more difficult to chop squarely. The result is an increasing and dangerous safety issue plus an increasing amount of work. These requirements and results are often incompatible with modern living, particularly in urban areas.

Splitting wood is a physically strenuous activity, albeit very fulfilling. Much of the physical strain comes from the action of picking up wood on the ground for the following reasons:
  to retrieve split wood for stacking,
  to retrieve split wood for further splitting,
  to reposition unsplit wood that has fallen over due to improper balance, and
  to reposition unsplit wood that has fallen over due to an inadequate impact from the ax swing, which usually takes the ax and user with it, causing further physical strain and possible injury to the user or standers-by.

Larger pieces of wood must be cut multiple times for fire logs, and are typically more difficult to cut than smaller pieces. An effective strategy is to use an ax, traditionally swung to penetrate the piece and cause an initial split, and then the ax is hammered into the piece with another tool, causing further splitting of the wood piece.

Reducing already cut pieces to kindling presents a different problem as many small pieces must be rendered from already split logs, usually quickly. This is a different operation as the vertical stability of the cut piece is much lower and the impact force, although lower, is still substantial. This Leads many users towards swinging at speed with one hand and using the other hand to hold the work piece until the last moment. This is another unsafe but unfortunately common practice.

The need for kindling arises periodically. Many users will pursue chopping in less than those ideal conditions which include a large and stable chopping block or other large scale chopping aid plus square cut chopped pieces. Such conditions include garages or sheds where a small supply of extra dry wood may be kept for this purpose. Often these pieces are cut close to square but not enough for the individual piece to remain vertically stable on their own when acted upon for kindling production, especially by high impact forces. As the kindling size is reduced it becomes increasingly difficult to maintain control of the piece before and after chopping and the workplace becomes increasingly messy and dangerous as the production of kindling proceeds.

PRIOR ART

In one area of the prior art individual larger pieces are held upright in a fixture ready for the striking blow. Many of these do not provide well for kindling.

U.S. Pat. No. 4,535,980, issued 1985, shows an attempt to provide for ease of chopping blocks of wood. The block is retained by gravity in a sloping receptacle where it is accessed for chopping from the top by an ax-man standing at one side. Reaction to the chopping action is provided by a small block of wood placed at the base. It is not known if this disclosure is in use as the structure is complex and requires special manufacturing while the usage shown is contrary to safe practices. Sloping the working block draws the user closer to the work and provides a higher likelihood of a chop going astray. Optimal chopping to direct the impact force directly on the grain is well past the vertical. Otherwise, much of the impact force is transferred directly to the device.

U.S. Pat. No. 4,515,195, also issued 1985, shows a mechanism to assist chopping by clamping a log in a vertical position. The device has an extended base providing support for the clamping tool and a 2 part clamp with concave support surfaces. As in US '980 the chopping is less than ideal and can become dangerous.

Other examples of this are shown in U.S. Pat. No. 4,239,198 to Trupp issued in 1980 and U.S. Pat. No. 4,326,703 to Marley issued in 1982

U.S. Pat. No. 4,505,465, issued 1985, shows a different approach. USP '465 provides a restraining band including a length of chain serially connected to an elastic cord with the cord and a portion of the chain surrounded by a protective sheath. The band is held in place on the chopping workpiece by compression from the band once it is tightened in place. The sheath protects the chain and the cord during chopping while the whole maintains the chopped pieces in their original location but provides no additional safety against missed swings of the ax.

Another technique involves the use of a tire which is placed on the ground or other support such as a rather larger base chopping block, arranged generally horizontally and used as a support for multiple logs within its central region. Such tires are often heavy and awkward to move about for storage or into position. Their very ruggedness offers an increased safety issue as any missed swing will most certainly bounce off the tough now-horizontal tire exterior but in a highly unpredictable manner. Similarly, the width of the tire necessitates the user to extent their chopping position by an unsafe distance.

In another type, a container is provided for the base block and item to be chopped which is resilient, as shown in USPPA (US published pending application) 2008/0073361 to Brouard. This case was abandoned in 2007. In that application a container includes the base block 14 and the wood element 24. A segregated piece is shown, also at 24.

The combination remains cumbersome and requires a rather large container along with the heavy base block. It is not suitable in urban settings.

Another example is that shown in USPPA 2014/0175724, on the application of Fiskars™. In that case a welt-known tool supplier has chosen the route of a fixed base block of the traditional type to which a collar is ices secured by a releasable clamp. The wood work piece is secured by a number of resilient fingers extending from the outer collar inwards to the work piece. Again, the result is cumbersome and dependent upon a secure connection between the chopping aid and the base block before and during any useful work. Thus, the collar must be custom tailored to a particular base block and remain so over the course of multiple work sessions occurring over a period of time. Necessarily, further complications arise from an effort in some embodiments to make the collar adjustable to fit, again subjecting the collar to weakness or work failure, neither of which is desirable.

OBJECTS OF INVENTION

It is an object of the invention to provide an inexpensive portable tool set to be readily kept at the site of chopping or splitting firewood for kindling purposes which assists in maintaining high safety standards, which provides additional protection against missed swings and which provides for storage and transportation of individual kindling pieces within the tool set plus ready storage of the tool set when not in use.

It is a further object of the invention to provide a tool set which readily confines wood pieces vertically during kindling or splitting production and which provides a sturdy chopping base without cumbersome binding restraints or clamps which would absorb impact energy.

It is a further object of the invention to provide a tool set which maintains traditional vertical work piece positioning of a plurality of work pieces as a group, traditional swing positioning (vertical motion at point of impact) and traditional impact energy distribution, while preventing fly off of cut pieces of kindling.

It is a further object of the invention to provide a tool set adapted for use with irregularly cut work pieces which would not stand vertically atone, either before or after cutting.

It is a further object of the invention to provide for simple and inexpensive manufacturing by the use of common molds and reduced shipping volumes.

It is a still further object of the invention to provide a tool set wherein the upper receptacle retains the cut kindling product for transportation and, upon completion of the work, is adapted to nest the lower or other receptacle for convenient storage and transportation.

It is a yet still further object of the invention to provide a kindling tool set which is simple to manufacture, long lasting, weatherproof and readily usable in all manner of conditions including cold and heat, which is light weight in use and transportation, which is simple to assemble and dissemble in seconds despite the conditions, and which is convenient to use and to store in a modern household environment.

SUMMARY OF THE INVENTION

The invention provides a firewood kindling tool set as a chopping aid including a nestable pair of open receptacles comprising an upper chopping receptacle and a lower chopping block receptacle including:

a an upper receptacle comprising a flexible and resilient outer generally cylindrical wall, preferably flared or slightly tapered outwards from top to bottom to create a trapezoidal cross-section, a sturdy chopping impact floor and a rim to support a plurality of work pieces upright for a continuous chopping action, the upper receptacle impact floor is removably secured to a sturdy chopping base adapted to support the upper receptacle and its contained work pieces at a safe height before, during and after chopping, and a the lower receptacle comprises a sturdy relatively inflexible generally cylindrical wall formed with a sturdy chopping impact bottom removably secured in an inverted position to the upper receptacle floor, and detachable means adapted to secure the said chopping base of said upper receptacle to said chopping impact bottom of said lower receptacle so as to provide an open upper receptacle for chopping wood and kindling and an inverted lower receptacle for positioning and impact resistance in a single unit, and a the receptacles may be nested inside one another when detached for storage and shipping.

The invention further provides a kindling tool set wherein the lower 174 receptacle includes vertical strengthening members adapted to transmit vertical impact forces from said chopping impact bottom to solid ground.

DRAWINGS

DESCRIPTION OF THE PREFERRED EMBODIMENT

Figure 1:
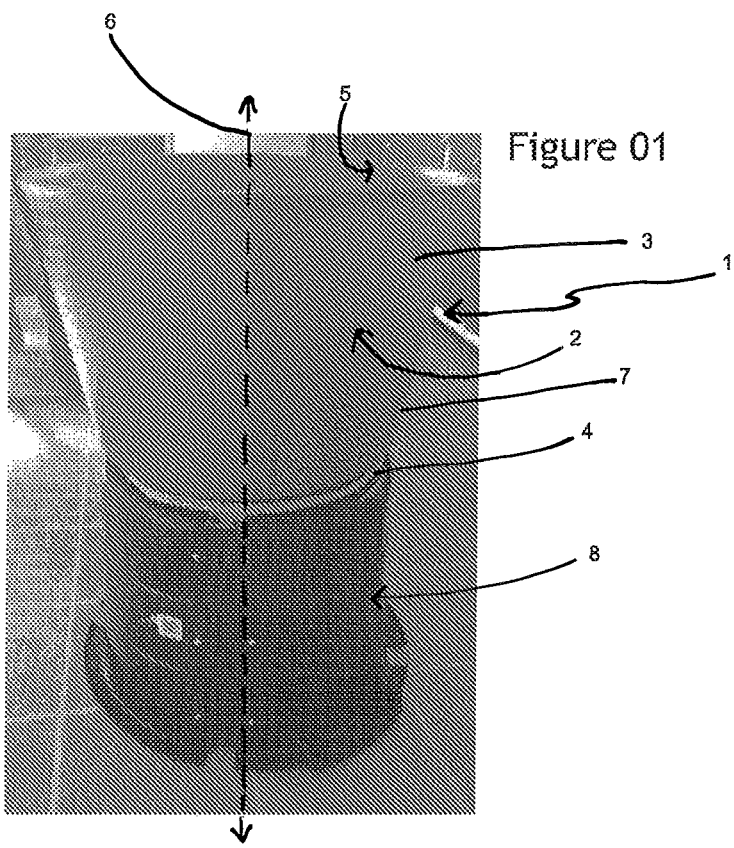
FIG. 01 is an overall perspective view of an embodiment of the invention in a fully assembled ready-to-use condition
Figure 2:
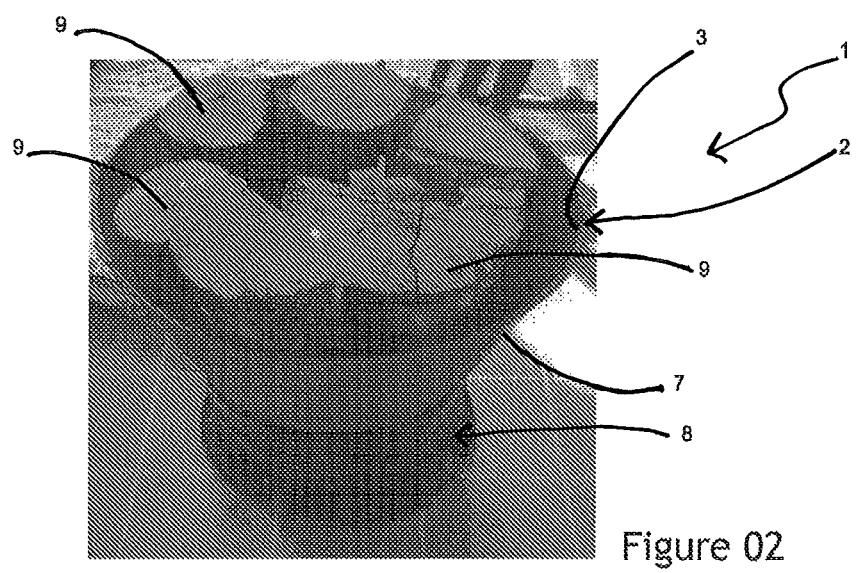
FIG. 02 is another perspective view of the embodiment of FIG. 1 with a supply of choppable work pieces.
Figure 3:
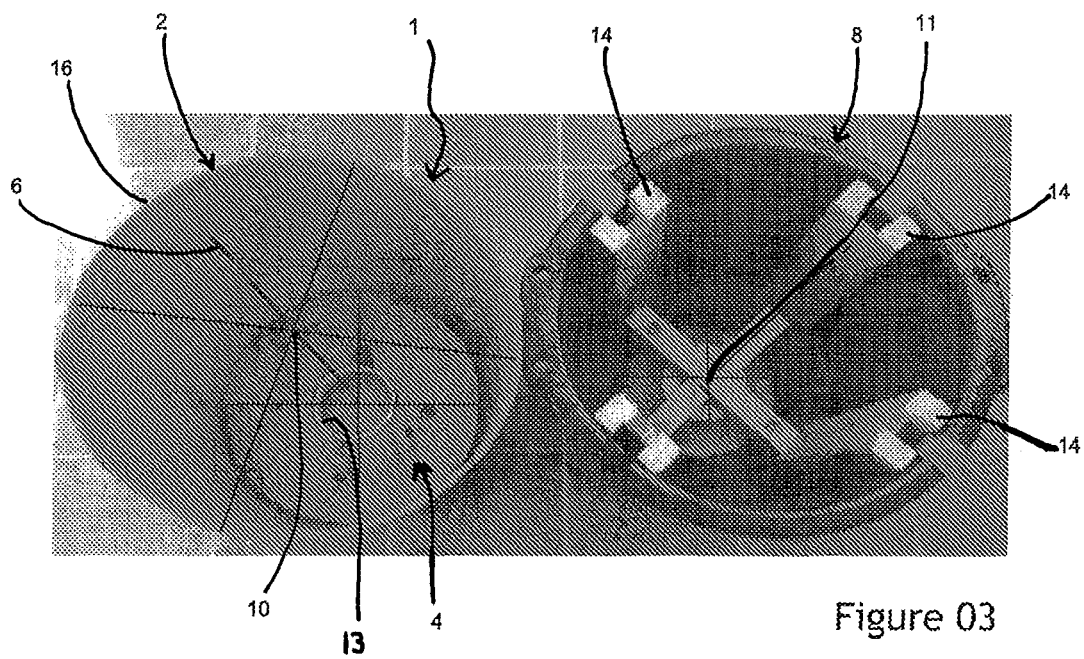
FIG. 03 is a interior plan view of the 2 components of the embodiment of FIGS. 1 and 2, shown disassembled.
Figure 4:
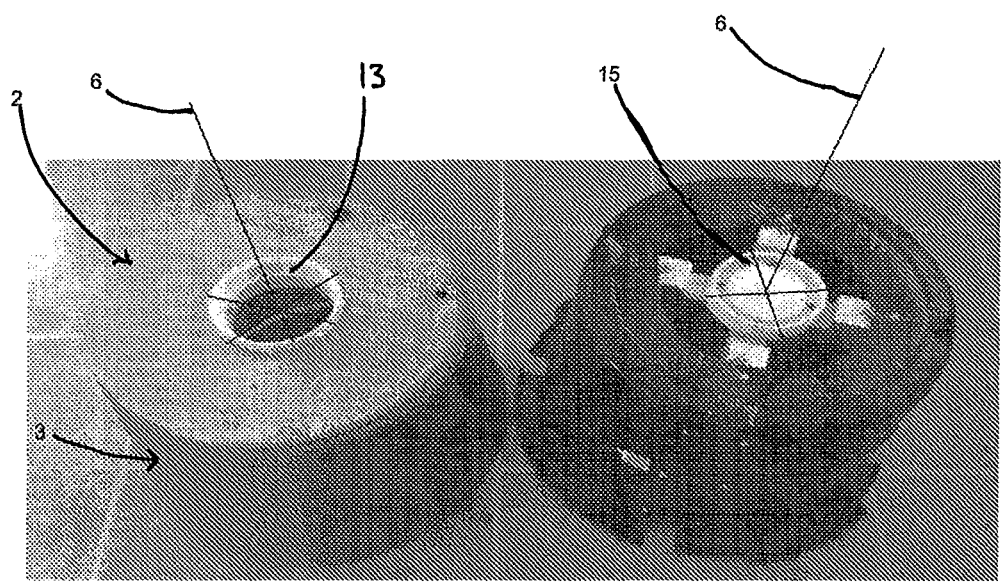
FIG. 04 is a exterior plan view of the 2 components of the embodiment of FIG. 3.

A preferred embodiment of the firewood chopping aid of the invention 1 is shown pictorially in FIGS. 1 through 4. In FIGS. 01 and 02 the aid 1 is shown fully assembled and ready for use. In FIGS. 03 and 04 the aid is shown disassembled on its way to storage. An upper chopping receptacle 2 (preferably in the form of an upstanding bucket) is formed of resilient and tear resistant material with a generally right-cylindrical (preferably continuous) outer wall 3 and an impact resisting floor 4 (See FIGS. 3 and 4). The upper receptacle in use is shown in FIGS. 01 and 02 upstanding with its open top 5 upright on a main aid axis 6 with a upwardly opening tapered configuration 7. Chopping forces upon impact and upon splitting are transmitted vertically and absorbed horizontally by the resilient outer wall 3.

Floor 7 is in turn supported upon a lower block receptacle 8 which is preferably cylindrical and formed of impact resisting non-resilient material so as to transmit.

Firewood pieces 9 are inserted into the upper bucket 2 where they are held in a generally upright condition ready for safe and convenient chopping action by the user, as shown in FIG. 2. The continuous thin side walls 3 of the upper bucket 2 restrain the chopped wood pieces 9 and any stray equipment actions by resiliently resisting non-vertical impact forces and returning to their original configuration (as shown in FIG. 02) once the impact forces have subsided. Preferably upper bucket receptacle 2 is flared or tapered outward from base to open top.

Preferably receptacles 2 and 8 are secured together in intimate contiguous contact as by threading so as to be co-axial along main vertical axis 6 and perpendicular to a ground plane surface when in use. FIG. 02 shows the chopping aid in its best-use condition with a variety of wood pieces 9 mutually self-supporting with the outer wall 3 and ready for reduction in to kindling.

FIG. 03 shows the aid 1 in disassembled condition with lower receptacle 8 inverted to show its interior. Main aid axis 6 includes upper receptacle central axis 10 and lower receptacle central axis 11 co-axially upon re-assembly as per FIGS. 01 and 02.

FIGS. 3 and 4 the base 4 surface of the upper bucket 2 is reinforced with a circular horizontal stiffener such as plywood which is adapted to absorb and transmit vertical chopping forces and restrain lateral movement. A threaded connection 13 in FIGS. 03 and 04 is added to the circular stiffener surface 4 for rotation of the upper bucket 2 about a vertical central axis 10 which screws the upper bucket 2 to the lower bucket 8 co-axially along main axis 6, thereby providing the working completed configuration of FIGS. 01 and 02.

The lower bucket of FIG. 4 is formed of sturdy non-resilient material and may be further reinforced by vertical, preferably inside mounted, support struts 14 as shown in FIG. 3. The bottom of the lower bucket is fitted with a female threaded connector 15 to be removably joined with threaded connection 13 on upper bucket 2 by being drawn in to intimate contiguous contact and secured there until release by the opposite motion. Preferably, the lower bucket receptacle is also tapered with a larger open bottom and a smaller base while remaining generally in the form of a tight-circular cylinder.

When assembled as shown in FIGS. 01 and 02 upper bucket 02 and lower bucket 8 are threadably abutted one to the other along main axis 6 for full support contiguous contact between upper floor 4 and lower base 12 and locked in place. The embodiment provides a unitary safe and ergonomic work platform and materials container. When disassembled, unthreaded, one bucket may be placed inside the other for convenient storage, other uses and immediate retrieval for use on a next occasion.

The outer wall 3 of the upper portion 2 is more flexible (rubberized), to absorb the increased horizontal forces of wood-splitting, than the lower portion 8 which is more rigid to absorb the reduced horizontal and increased vertical force of wood-splitting. The upper edge 16 alternatively incorporates a metal ring to prevent tearing during prolonged wood-splitting. The base 12 replicates the absorption and distribution of vertical force from wood-splitting of a traditional corded log, ie the chopping block. Together the receptacles 2 and 12 may be readily and simply manufactured, and then used and stored on an as needed basis, increasing safety.

Figure 5:
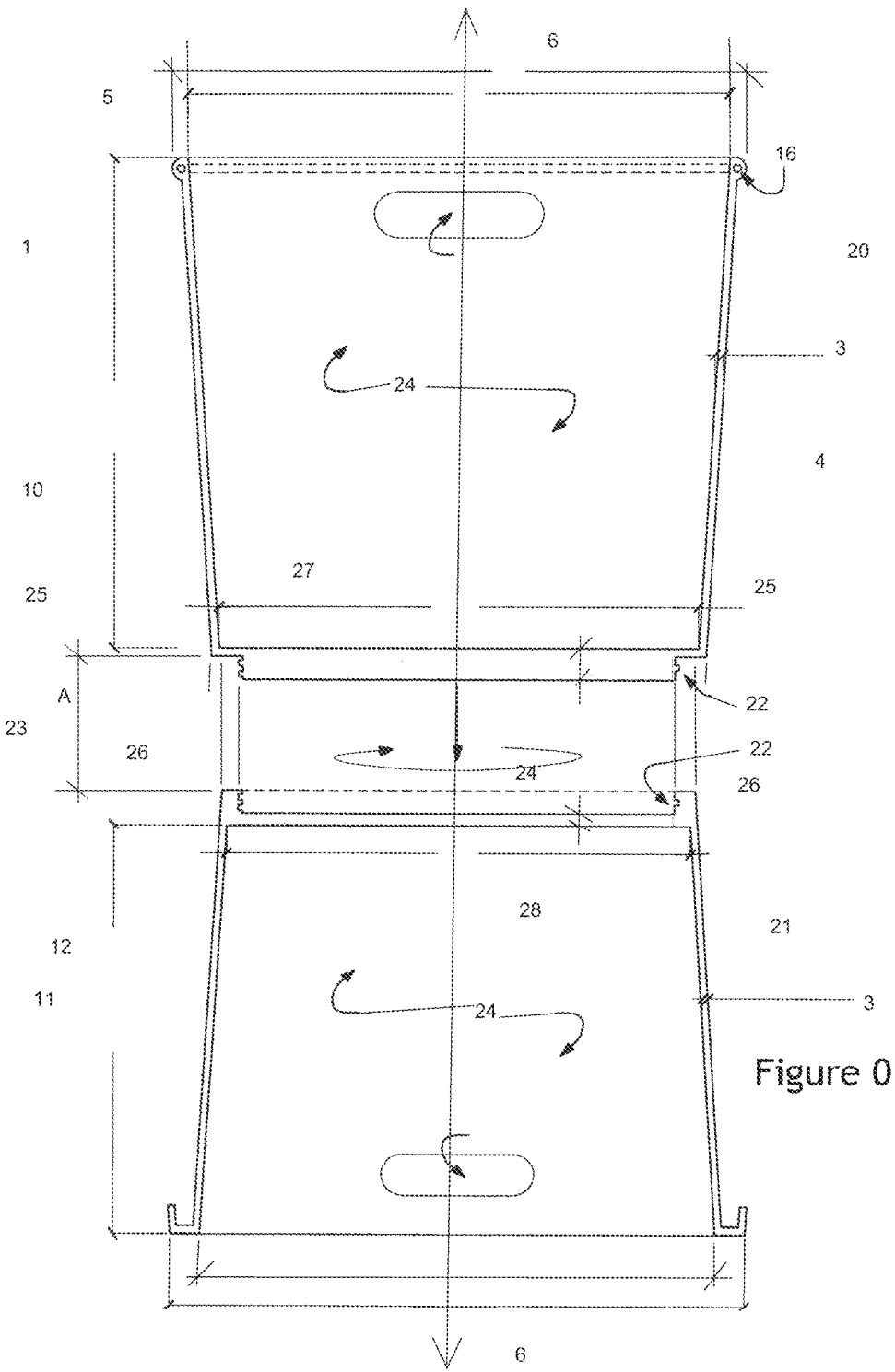
FIG. 05 is a central vertical cross-section of an alternative embodiment of the invention shown exploded along the vertical axis and ready for assembly, then use.
Figure 6:
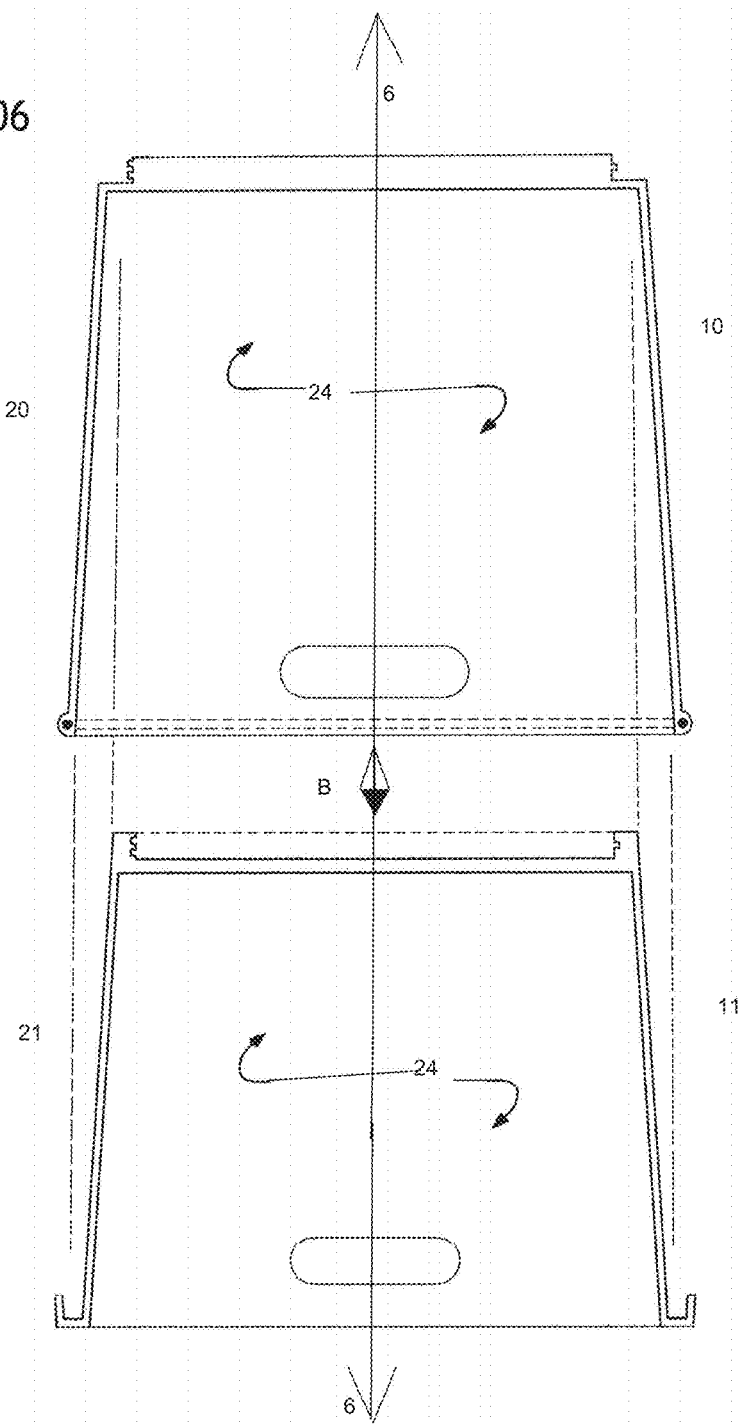
FIG. 06 is a further cross-section of the embodiment of FIG. 5, shown ready dis-assembled and ready for storage by telescoping along the vertical axis.
Figure 7:
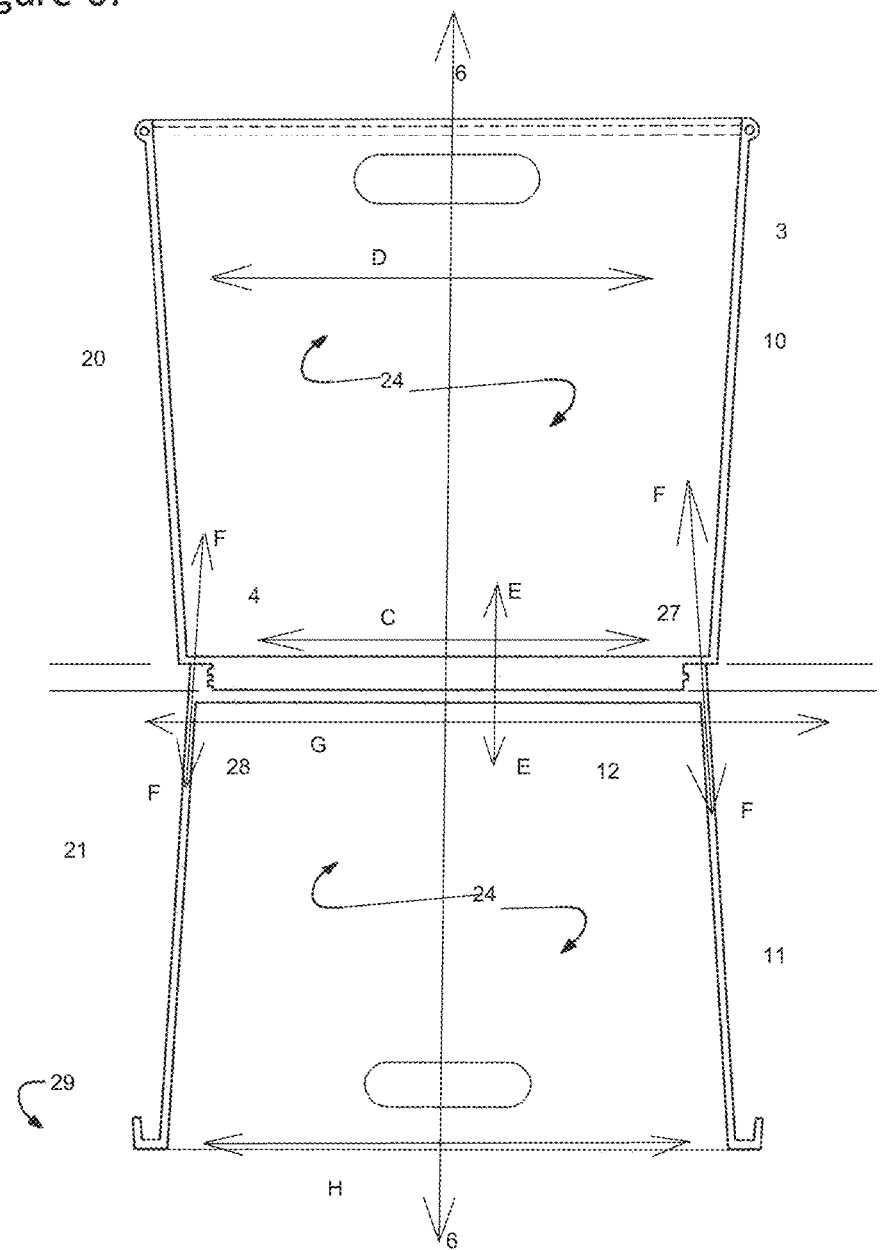
FIG. 07 is a further vertical central cross-section of the embodiment of FIGS. 5 and 6, shown with the upper receptacle upright, the lower receptacle inverted and ready for use by threading the assembly together along a vertical axis.

FIGS. 05 through 07 show an alternative embodiment in which the receptacles may be molded. Both upper and lower buckets 20 and 21 are formed as individual units with integral exterior locking mating threads 22. The buckets include reinforced, preferably thickened, bottoms 4 and 12 formed into and as part of their respective side walls 3. Threading 22 is sufficient to provide a positive locking in the fully threaded condition wherein the bottom surfaces of the upper and lower buckets abut each other over some, or preferably their entire, contact surfaces. FIG. 05 shows the aid 1 ready for assembly. Firstly, axes 10 and 11 are aligned vertically co-axially along axis 6 and brought together a distance A along vertical direction 23. Secondly, the buckets 20 and 21 are threaded together in direction 24 until annular mating surface 25, 26 and circular mating surfaces 27 and 28 firmly abut one another.

In FIG. 06 the aid of FIGS. 05 and 07 is disassembled as by being unthreaded and the upper receptacle 20 inverted. In this position the upper receptacle 20 may be telescoped or nested over lower receptacle 21 by motion B along main axis 6 for a highly collapsed mutually contained storage of the aid as a single unit, or alternatively used as a separated pair of buckets for transportation of solid or liquid materials.

In FIG. 07 the chopping aid of FIGS. 05 and 06 is shown fully assembled and resting on ground plane 29 with main axis 6 vertical and perpendicular to ground plane 29. Chopping forces initially and nominally along axis 6 has resolved into vertical forces along direction E-E and horizontal forces along directions C and D. D direction forces are absorbed in to resilient outer wall 3. C direction forces are restrained in the bases 4 and 12. The majority of impact and other forces are transmitted along directions F-F through the abutting mating surfaces 25, 26, 27 and 28 along outer wall 30 of lower block receptacle 8 into the ground plane substantially isolated from lateral forces along directions C and D. The open circular form of lower block receptacle 21 and its non-resilient material add further restraint against horizontal forces H along the ground plane.

Figure 8:
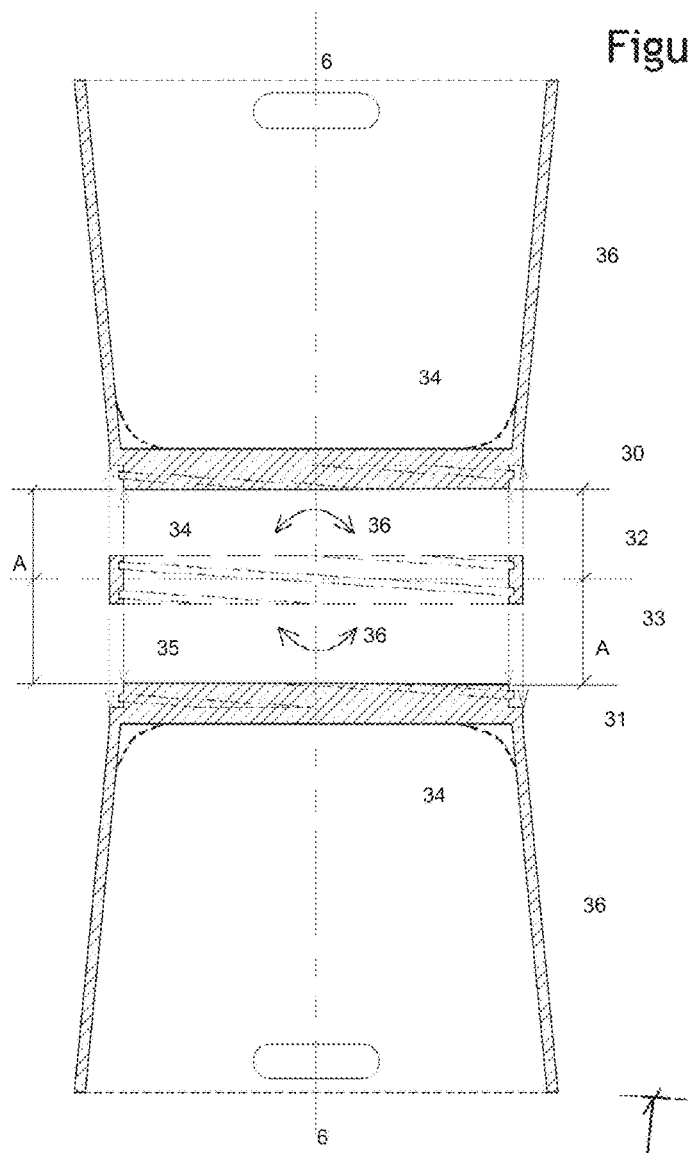
FIGS. 08 and 08A are a cross-section of a preferred embodiment of FIG. 5, shown fully assembled by rotation of the upper and lower receptacles to lock the threads, and disassembled, in partial perspective.
Figure 8A:
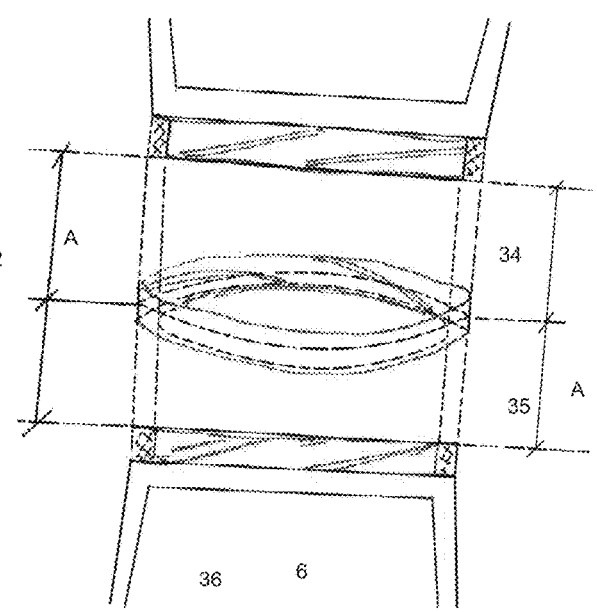

FIGS. 08 and 08a show the preferred embodiment of the invention. Upper and lower receptacle buckets 36 are formed identically as by the same mold but of resilient and non-resilient materials respectively. Reinforcing corners 34 may be provided. Identical male threads 30 and 31 respectively are formed in the upper and lower receptacles at their bases. A co-operating annular collar 32 (see particularly FIG. 08a) is provided with a single female thread 37 on its interior adapted to receive the male threads 30 and 31 by co-rotation of receptacles 36 about main axis 6 in direction 36. This treading brings upper and lower mating surfaces 34 and 35 into intimate bearing contact along direct A and locks the receptacles together. Preferably, collar 32 is threaded equally in respect of mating surfaces 34 and 35 so that mating surfaces 34 and 35 meet continuously along collar center line 33 and along the mating surfaces shown as 25 and 26 in FIG. 05.

Included here is a table showing the drawing references for convenience:

| | |
|---|---|
| 1 | Embodiment FIG. 1-4 |
| 2 | Upper receptacle |
| 3 | Outer wall |
| 4 | Upper floor |
| 5 | Open top |

| | |
|---|---|
| 6 | Main aid axis |
| 7 | Upwardly opening taper |
| 8 | Lower block receptacle |
| 9 | Firewood pieces |
| 10 | Upper receptacle axis |
| 11 | Lower receptacle axis |
| 12 | Lower base |
| 13 | Threaded connection |
| 14 | Interior support struts |
| 15 | Female threaded connector |
| 16 | Upper edge reinforcing wire |
| 20 | Upper bucket |
| 21 | Lower bucket |
| 22 | Exterior locking thread |
| 23 | Assembly direction |
| 24 | Threading direction |
| 25 | Upper annular contact surface |
| 26 | Lower annular contact surface |
| A | distance |
| B | telescoping |
| C-H | forces |
| 27 | Upper circular mating surface |
| 28 | Lower circular mating surface |
| 29 | Ground plane |
| 30 | Upper male thread |
| 31 | Lower male thread |
| 32 | Annular collar |
| 33 | Collar center line |
| 34 | Upper mating surface |
| 35 | Lower mating surface |
| 36 | Identical receptacles |
| 37 | Female thread for collar |

Although the present invention has been disclosed and described with reference to certain embodiments thereof, it should be noted that other variations and modifications may be made, and it is intended that the description, drawings and claims cover the variations and modifications within the true scope of the invention.

What I claim is:

1. A firewood splitting aid comprising:
   i. an upper receptacle including:
      A. an open top;
      B. a resilient and continuous side wall and
      C. a base coupled to the side wall remote from the open top, wherein the side wall and base define an interior chamber sized to receive at least one piece of firewood therein;
   ii. a lower receptacle including:
      A. a base;
      B. a substantially rigid and continuous side wall, wherein the base of the lower receptacle is coupled to the side wall of the lower receptacle; and
      C. an open bottom remote from the base of the lower receptacle, wherein the open bottom is adapted to rest on a flat surface;
      wherein the lower receptacle is disposed vertically below the upper receptacle and the base of the upper receptacle contacts the base of the lower receptacle; and
   iii. a connector assembly that detachably secures the base of the upper receptacle to the base of the lower receptacle.

2. The firewood splitting aid as claimed in claim 1 wherein the connector assembly includes male and female threaded portions.

3. The firewood splitting aid as claimed in claim 2 wherein the connector assembly intimately mates the base of the upper receptacle and the base of the lower receptacle together for chopping and releases the base of the upper receptacle from the base of the lower receptacle for storage.

4. The firewood splitting aid as claimed in claim 3 wherein the connector assembly includes circular contact regions on at least one of the base of the upper receptacle and the base of the lower receptacle centered on a vertical axis.

5. The firewood splitting aid as claimed in claim 4 wherein the connector assembly includes annular contact regions on each of the base of the upper receptacle and the base of the lower receptacle centered on the vertical axis.

6. The firewood splitting aid as claimed in claim 2 wherein the threaded portions draw the the base of the upper receptacle and the base of the lower receptacle into secure intimate contact with each other.

7. The firewood splitting aid as claimed in claim 1 wherein the base of the upper receptacle base includes a stiffening structure.

8. The firewood splitting aid as claimed in claim 1 wherein the lower receptacle includes a stiffening structure in its side wall and its base.

9. The firewood splitting aid as claimed in claim 6 wherein the threaded portions are aligned with the respective side walls of the upper receptacle and the lower receptacle at the extremity of the respective bases of the upper receptacle and the lower receptacle.

10. A firewood splitting aid as claimed in claim 1 wherein the connector assembly includes one of a male threaded portion and a female threaded portion integral with each of the upper and lower receptacles and further includes an annular collar.

11. The firewood splitting aid as claimed in claim 10 wherein the annular collar includes a threaded portion.

12. The firewood splitting aid as claimed in claim 11 wherein the annular collar receives the one of the male threaded portion and female threaded portion to an extent of a central line perpendicular to a common vertical axis of the upper receptacle and lower receptacle.

13. The firewood splitting aid as claimed in claim 12 wherein the annular collar intimately contacts the side walls of the upper receptacle and the lower receptacle.

14. The firewood splitting aid as claimed in claim 1 wherein the side wall of the upper receptacle is tapered outwards from the base of the upper receptacle to the open top thereof.

15. The firewood splitting aid as claimed in claim 14 wherein the upper receptacle includes annular stiffeners oriented perpendicular to a vertical axis that is common to the upper receptacle and lower receptacle.

16. The firewood splitting aid as claimed in claim 1 wherein the lower receptacle is tapered outwards from the base of the lower receptacle to the open bottom thereof.

17. The firewood splitting aid as claimed in claim 1 wherein the lower receptacle includes horizontal and axial stiffeners.

18. The firewood splitting aid as claimed in claim 1 wherein the upper and lower receptacles nest when separated from each other for storage.

19. A method of chopping firewood comprising:
    placing an open bottom of a lower receptacle on a flat surface;
    placing a base of an upper receptacle onto a top of the lower receptacle;
    engaging a first mating member provided on the lower receptacle with a second mating member provided on the upper receptacle;
    securing the upper receptacle to the lower receptacle using the first and second mating members;

placing a piece of firewood into a cavity bounded and defined by a flexible sidewall of the upper receptacle;

striking the piece of firewood;

splitting the piece of firewood into smaller pieces of firewood;

transferring a force generated by striking the piece of firewood from the upper receptacle to a rigid sidewall of the lower receptacle;

transferring the force from the rigid sidewall to the flat surface; and containing the smaller pieces of firewood in the cavity of the upper receptacle.

20. A firewood splitting aid comprising:

an upper receptacle defining an open top and adapted to receive a piece of firewood therein;

a bottom provided on the upper receptacle;

a lower receptacle vertically disposed beneath the upper receptacle, said lower receptacle defining an open bottom;

a top provided on the lower receptacle;

wherein the top of the lower receptacle and the bottom of the upper receptacle each include a complementary-shaped mating surface of an engagement member;

wherein the mating surfaces are located on the bottom of the upper receptacle and on the top of the lower receptacle, respectively, and are located a distance inwardly from a sidewall of the respective one of the upper receptacle and lower receptacle; and wherein the mating surfaces of the engagement member cooperate and are operatively engaged to secure the upper receptacle to the lower receptacle.

* * * * *